(12) United States Patent
Kamitani et al.

(10) Patent No.: US 7,851,106 B2
(45) Date of Patent: Dec. 14, 2010

(54) FUEL CARTRIDGE

(75) Inventors: Toshimi Kamitani, Fujioka (JP);
Yasunari Kabasawa, Hamura (JP)

(73) Assignees: Mitsubishi Pencil Co., Ltd.,
Shinagawa-Ku, Tokyo (JP); Casio Computer Co., Ltd., Shibuya-Ku, Tokyo (JP)

( * ) Notice: Subject to any disclaimer, the term of this patent is extended or adjusted under 35 U.S.C. 154(b) by 124 days.

(21) Appl. No.: 11/794,733

(22) PCT Filed: Jan. 27, 2006

(86) PCT No.: PCT/JP2006/301351

§ 371 (c)(1),
(2), (4) Date: Jul. 5, 2007

(87) PCT Pub. No.: WO2006/082759

PCT Pub. Date: Aug. 10, 2006

(65) Prior Publication Data

US 2008/0311460 A1    Dec. 18, 2008

(30) Foreign Application Priority Data

Feb. 4, 2005    (JP) .............................. 2005-029345

(51) Int. Cl.
*H01M 8/02*    (2006.01)
(52) U.S. Cl. ...................................... 429/513; 429/492
(58) Field of Classification Search .................. 429/35, 429/434, 72, 513, 492, 515
See application file for complete search history.

(56) References Cited

U.S. PATENT DOCUMENTS

| | | | |
|---|---|---|---|
| 5,364,711 A | 11/1994 | Yamada et al. | |
| 5,432,023 A | 7/1995 | Yamada et al. | |
| 6,777,118 B2 | 8/2004 | Shioya | |
| 6,824,905 B2 | 11/2004 | Shioya et al. | |
| 6,916,565 B2 | 7/2005 | Shioya | |
| 7,169,367 B2 | 1/2007 | Takeyama et al. | |
| 2004/0067394 A1 | 4/2004 | Sadamoto et al. | |
| 2005/0233189 A1 | 10/2005 | Shioya | |
| 2006/0008686 A1 | 1/2006 | Kabasawa | |

FOREIGN PATENT DOCUMENTS

| | | | |
|---|---|---|---|
| EP | 1 758 190 | * | 2/2009 |
| JP | 59-066066 A | | 4/1984 |
| JP | 05-258760 A | | 10/1993 |
| JP | 05-307970 A | | 11/1993 |
| JP | 06-188008 A | | 7/1994 |
| JP | 2001-102069 A | | 4/2001 |

(Continued)

*Primary Examiner*—Jennifer Michener
*Assistant Examiner*—Monqiue Wills
(74) *Attorney, Agent, or Firm*—Buchanan Ingersoll & Rooney PC

(57) ABSTRACT

Provided is a fuel cartridge detachably connected with a fuel cell main body, wherein the fuel cartridge is equipped with a fuel-storing vessel for storing a liquid fuel, a fuel discharge part and a follower which seals the liquid fuel and moves as the liquid fuel is consumed at the rear end of the liquid fuel; a follower auxiliary member which has no fluidity and is insoluble in the liquid fuel is inserted into the follower; and at least one protruding part is formed at an upper end part of the follower auxiliary member.

11 Claims, 8 Drawing Sheets

FOREIGN PATENT DOCUMENTS

| | | |
|---|---|---|
| JP | 2002-270210 A | 9/2002 |
| JP | 2003-092128 A | 3/2003 |
| JP | 2003-229158 A | 8/2003 |
| JP | 2003-297411 A | 10/2003 |
| JP | 2003-299946 A | 10/2003 |
| JP | 2003-340273 A | 12/2003 |
| JP | 2004-142831 A | 5/2004 |
| JP | 2004-206994 A | 7/2004 |
| JP | 2004-281340 A | 10/2004 |
| JP | 2005-000111 A | 1/2005 |
| JP | 2004-063200 | * 2/2008 |
| WO | WO 2005/122308 | * 12/2005 |

* cited by examiner

FUEL CARTRIDGE

TECHNICAL FIELD

The present invention relates to a fuel cartridge, more specifically to a fuel cartridge suited to a small-sized fuel cell used as an electric power source for portable electronic appliances such as cellular phones, note type personal computers, PDA, digital cameras and electronic notebooks.

BACKGROUND ART

In general, a fuel cell comprises a cell on which an air electrode layer, an electrolyte layer and a fuel electrode layer are laminated, a fuel-supplying part for supplying a fuel as a reducing agent to the fuel electrode layer and an air-supplying part for supplying air as an oxidizing agent to the air electrode layer, and it is an electric cell in which electrochemical reaction takes place in the cell between fuel and oxygen in the air to provide an electric power to the outside. Fuel cells of various types are developed.

In recent years, because of a rise in consciousness to environmental problems and energy saving, it is studied to use a fuel cell as a clean energy source for various applications. In particular, attentions have been paid to fuel cells which can generate electric power by only supplying directly a liquid fuel comprising methanol and water (refer to, for example, patent documents 1 and 2).

Among them, various liquid type fuel cells making use of capillary force for supplying a liquid fuel are known (refer to, for example, patent documents 3 to 7).

Liquid type fuel cells described in the above respective patent documents supply a liquid fuel from a fuel tank to a fuel electrode by virtue of capillary force, and therefore they do not require a pump for sending a liquid fuel with pressure, so that they have merits in reducing a size.

Such liquid type fuel cells as merely making use of only capillary force of a porous body and/or a fiber bundle disposed in a fuel reservoir to supply a fuel are suited to reduction in a size in terms of constitution, but because a fuel is supplied directly to a fuel electrode in the form of liquid, the fuel follows imperfectly during use over a long period of time under use environment in which it is mounted on a small-sized portable appliance and in which the direction of a fuel cell is changed very often in every direction, and the trouble that the fuel is cut off from being supplied is brought about, so that it is difficult to supply constantly the fuel to an electrolyte layer.

On the other hand, known as one of countermeasures for solving the above defects is, for example, a fuel cell system in which a liquid fuel is introduced into a cell by virtue of capillary force and in which the liquid fuel is then vaporized in a fuel vaporizing layer and used (refer to, for example, patent document 8). However, it has the problem that poor followability of a fuel which is a fundamental problem is not improved, and involved therein is the problem that it is difficult to reduce a size of the fuel cell having the above structure because of the system in which a liquid is vaporized and then used as a fuel.

Further, known is a fuel reservoir containing a high viscous liquid such as mineral oils, silicone oils and the like which is loaded in a vessel main body having an outlet port so that it is brought into contact with a fuel at the side opposite to the outlet port side (refer to, for example, patent document 9). However, when a volume of a liquid fuel is increased and a cartridge diameter is large, involved therein are the problems that the fuel follows imperfectly during use over a long period of time under use environment in which the direction of the fuel reservoir is changed very often, particularly in horizontal disposition and that the high viscous liquid falls and separates from the fuel to allow the fuel to spill out.

As described above, in conventional fuel cartridges, the existing situation is that a liquid fuel is instably supplied in supplying the fuel directly to a fuel electrode to cause fluctuation in an output value during operation and that it is difficult to reduce a size thereof to such an extent that they can be mounted on portable appliances while maintaining stable characteristics.

Patent document 1: Japanese Patent Application Laid-Open No. 258760/1993 (claims, examples and others)

Patent document 2: Japanese Patent Application Laid-Open No. 307970/1993 (claims, examples and others)

Patent document 3: Japanese Patent Application Laid-Open No. 66066/1984 (claims, examples and others)

Patent document 4: Japanese Patent Application Laid-Open No. 188008/1994 (claims, examples and others)

Patent document 5: Japanese Patent Application Laid-Open No. 229158/2003 (claims, examples and others)

Patent document 6: Japanese Patent Application Laid-Open No. 299946/2003 (claims, examples and others)

Patent document 7: Japanese Patent Application Laid-Open No. 340273/2003 (claims, examples and others)

Patent document 8: Japanese Patent Application Laid-Open No. 102069/2001 (claims, examples and others)

Patent document 9: Japanese Patent Application Laid-Open No. 281340/2004 (claims, examples and others)

DISCLOSURE OF THE INVENTION

Problem to be Solved by the Invention

In light of the problems and the existing situation in the conventional fuel cartridges described above, the present invention has been made in order to solve them, and an object thereof is to provide a fuel cartridge in which a liquid fuel is stably supplied directly to a fuel cell main body and in which the liquid fuel is not lost in storage, particularly a fuel cartridge in which even when a volume of a liquid fuel is increased and a cartridge diameter is large, the liquid fuel is stably supplied directly to a fuel cell main body and in which the liquid fuel is not lost in storage.

Means for Solving Problem

Intensive studies on the conventional problems described above repeated by the present inventors have resulted in finding that the object described above is achieved by a fuel cartridge detachably connected with a fuel cell main body, wherein it is equipped with a fuel-storing vessel for storing a liquid fuel, a fuel discharge part and a follower having specific physical properties and a follower auxiliary member having a specific structure at the rear end of the liquid fuel, and thus the present invention has come to be completed.

That is, the present invention comprises the following items (1) to (11).

(1) A fuel cartridge detachably connected with a fuel cell main body, wherein the fuel cartridge is equipped with a fuel-storing vessel for storing a liquid fuel, a fuel discharge part and a follower which seals the liquid fuel and moves as the liquid fuel is consumed and which is installed at the rear end of the liquid fuel; a follower auxiliary member which has no fluidity and is insoluble in the liquid fuel is inserted into the follower; and at least one protruding part is formed at an upper end part of the follower auxiliary member.

(2) The fuel cartridge as described in the above item (1), wherein the follower comprises at least one selected from the group consisting of liquids which are insoluble or slightly soluble in the liquid fuel and gelatinous matters of the liquids, and the follower has a specific gravity of 90 to 200% based on a specific gravity of the liquid fuel.

(3) The fuel cartridge as described in the above item (2), wherein the insoluble or slightly soluble liquid comprises a non-volatile or slightly volatile organic solvent, and the gelatinous matter of the insoluble or slightly soluble liquid comprises a non-volatile or slightly volatile organic solvent and a thickener.

(4) The fuel cartridge as described in the above item (3), wherein the non-volatile or slightly volatile organic solvent is at least one selected from the group consisting of polybutene, mineral oils, silicone oils and liquid paraffins.

(5) The fuel cartridge as described in the above item (3), wherein the thickener is at least one selected from the group consisting of styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

(6) The fuel cartridge as described in any one of the above items (1) to (5), wherein the follower auxiliary member has a cross-sectional area of 50% or more based on a cross-sectional area of the fuel-storing vessel in a diameter direction.

(7) The fuel cartridge as described in any one of the above items (1) to (6), wherein the follower auxiliary member is any of solid, a hollow structure and a porous body.

(8) The fuel cartridge as described in any one of the above items (1) to (7), wherein a part of the protruding part is projected from the follower.

(9) The fuel cartridge as described in any one of the above items (1) to (8), wherein the liquid fuel is at least one selected from the group consisting of a methanol solution, an ethanol solution, dimethylether (DME), formic acid, hydrazine, an ammonia solution, ethylene glycol and a sodium boron hydride aqueous solution.

(10) The fuel cartridge as described in any one of the above items (1) to (9), wherein a surface free energy of at least a wall face which is brought into contact with the liquid fuel in the fuel-storing vessel is controlled to a lower value than a surface free energy of the liquid fuel.

(11) The fuel cartridge as described in any one of the above items (1) to (10), wherein the fuel cell main body assumes a structure in which plural unit cells each of which is formed by constructing an electrolyte layer on the outer surface of a fuel electrode body and constructing an air electrode layer on the outer surface of the electrolyte layer are joined and in which a fuel-supplying member connected with the fuel cartridge is connected with the unit cell described above to supply the liquid fuel.

Effects of the Invention

According to the present invention, provided is a fuel cartridge in which even when a volume of a liquid fuel is increased and a cartridge diameter is large, the fuel is prevented from following imperfectly and a follower is prevented from falling to separate from the liquid fuel and in which a liquid fuel is stably supplied directly to a fuel cell main body and the liquid fuel is not lost in storage.

According to the invention of the above items (2) to (11), obtained is a fuel cartridge in which a liquid fuel is more stably supplied directly to a fuel cell main body and in which loss of the liquid fuel is very small in storage.

LIST OF REFERENCE NUMERALS AND LETTERS

A: Fuel cartridge
F: Liquid fuel
10: Fuel-storing vessel
11: Fuel discharge part
12: Follower 13: Follower auxiliary member
13a: Protruding part

BEST MODE FOR CARRYING OUT THE INVENTION

The embodiments of the present invention shall be explained below in details with reference to the drawings.

Figure 1A:
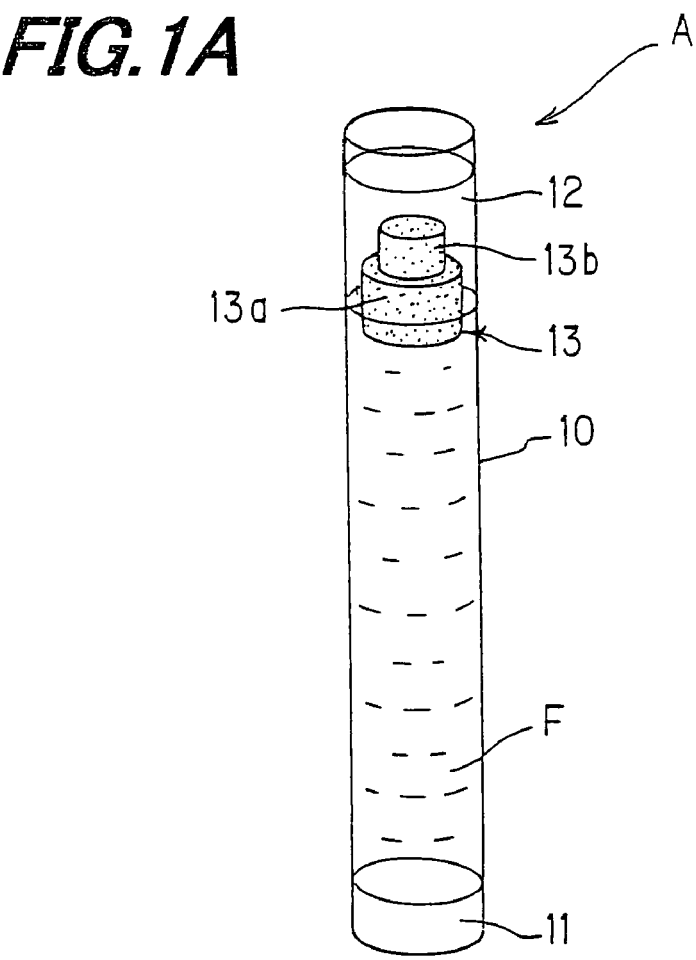
FIG. 1 (a) is an outline vertical cross-sectional drawing showing a fuel cartridge of the first embodiment according to the present invention, and (b) is a plain view thereof.
Figure 1B:
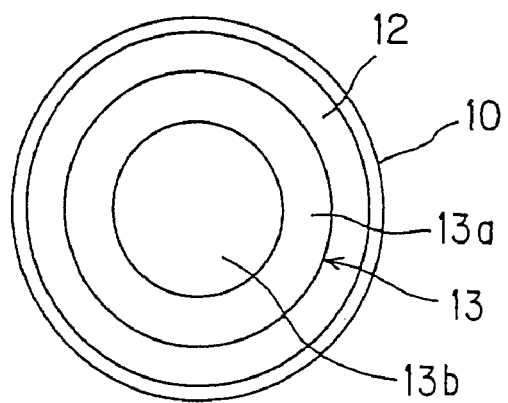
Figure 2A:
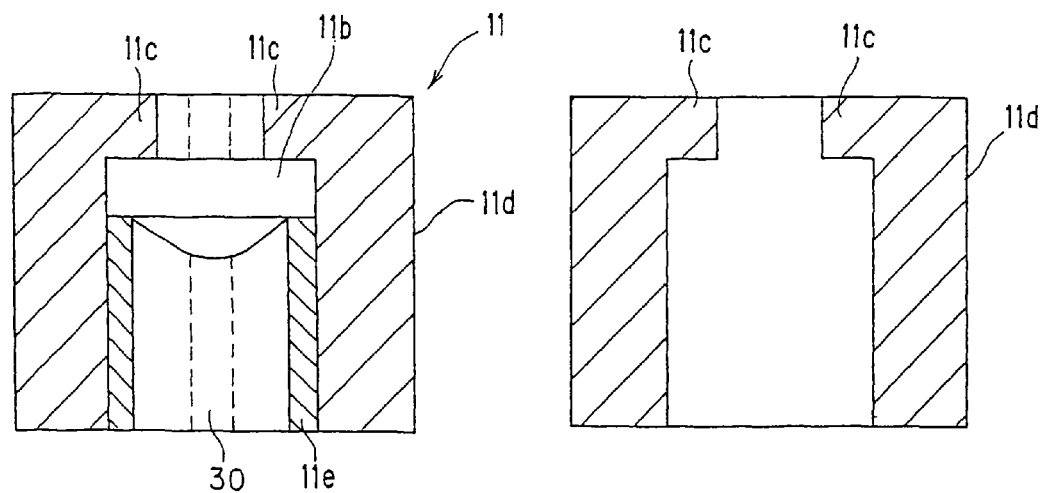
FIG. 2 (a) to (d) show a check valve which is a fuel discharge part in the present invention, wherein (a) is a vertical cross-sectional drawing of the check valve; (b) is a vertical cross-sectional drawing of a valve adaptor; (c) is a vertical cross-sectional drawing of a check valve body; and (d) is a plain view of the check valve body.
Figure 2B:
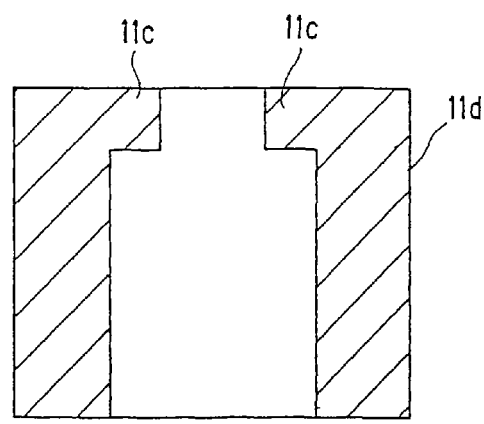
Figure 2C:
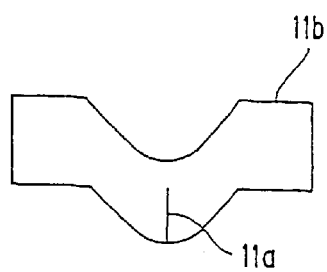
Figure 2D:
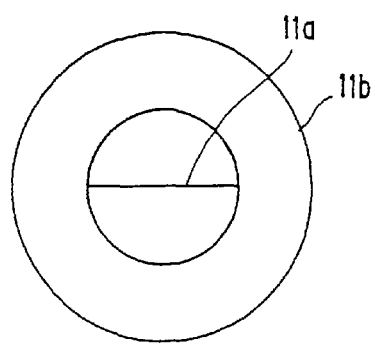

FIG. 1 to FIG. 2 show a fundamental mode (first embodiment) of a fuel cartridge A showing the fundamental embodiment of the present invention.

The fuel cartridge A of the first embodiment is detachably connected with a fuel cell main body, wherein it comprises a fuel-storing vessel 10 of a tube type for storing a liquid fuel F, a fuel discharge part 11 and a follower 12 which seals the liquid fuel and moves as the liquid fuel is consumed at the rear end of the liquid fuel F; a follower auxiliary member 13 which has no fluidity and is insoluble in the liquid fuel F is inserted into the follower 12; and at least one protruding part 13b is formed at an upper end part of the follower auxiliary member 13.

The fuel-storing vessel 10 of a tube type described above is preferably constituted of a material having storage stability and durability against a liquid fuel stored therein, a gas non-permeating property (gas non-permeating property against oxygen gas, nitrogen gas and the like) and light transmittance so that the remaining amount of the liquid fuel can visually be observed.

The material of the fuel-storing vessel 10 includes, for example, metals such as aluminum and stainless steel when light transmittance is not required, synthetic resins and glass, and from the viewpoints of visibility of the remaining amount of the liquid fuel described above, a gas non-permeating property, reduction in a cost in producing and assembling and easiness of production, the fuel-storing vessel is preferably constituted of a single layer structure of a single kind of resin or a multilayer structure of two or more layers comprising two or more kinds of resins such as polypropylene, polyvinyl alcohol, ethylene-vinyl alcohol copolymer resins, polyacrylonitrile, nylon, cellophane, polyethylene terephthalate, polycarbonate, polystyrene, polyvinylidene chloride and polyvinyl chloride each having the respective characteristics described above. In the case of the multilayer structure, as long as at least one layer is constituted of a resin having the performances described above (the gas non-permeating property and the like), problems in terms of actual use are not involved therein even if the remaining layers are constituted of ordinary resins. Such tubes having a multilayer structure can be produced by extrusion molding, injection molding and co-extrusion molding.

A size of the fuel-storing vessel 10 of a tube type described above can be an inner diameter of 5 to 50 mm, further 10 to 50 mm and a length of 30 to 200 mm, because as described later, even if the fuel cartridge has a large cartridge diameter due to an increased volume of the liquid fuel, the liquid fuel is prevented from following imperfectly and the follower is prevented from falling to separate from the liquid fuel, whereby the effects of the present invention can be exhibited.

The fuel discharge part 11 includes, for example, one comprising a valve structure, and it is constituted of a check valve in the present embodiment. This check valve has the same constitution as those of members used in writing instruments, and as shown in FIG. 2 (a) to (d), it prevents foreign matters such as air from coming in the liquid fuel F stored directly in the fuel-storing vessel 10 from the periphery of a fuel-supplying tube described later due to a change in the barometric pressure and the temperature. It is constituted of a circular (or elliptic) check valve body 11b which is dome-shaped in a central part and has a slit 11a, a stopper part 11c for supporting the above check valve body 11b, a valve adaptor 11d having 11c and a cylindrical holder 11e for holding the check valve body 11b, and it assumes a structure in which foreign matters such as air are prevented from coming in during suspension in use (non-use). This is to prevent troubles such as leaking and spouting of a fuel which are brought about by increase in a pressure of the storing vessel 10 which is a liquid fuel storing tank due to coming in of air.

Materials for the above check valve 11 including the check valve body 11b shall not specifically be restricted as long as they have storage stability and durability against the liquid fuel stored, gas non-permeability and elasticity by which they can be adhered tightly to the fuel-supplying tube. They include synthetic resins such as polyvinyl alcohol, ethylene vinyl alcohol copolymer resins, polyacrylonitrile, nylon, cellophane, polyethylene terephthalate, polycarbonate, polystyrene, polyvinylidene chloride and polyvinyl chloride, rubbers such as natural rubber, isoprene rubber, butadiene rubber, 1,2-polybutadiene rubber, styrene-butadiene rubber, chloroprene rubber, nitrile rubber, butyl rubber, ethylene-propylene rubber, chlorosulfonated polyethylene rubber, acryl rubber, epichlorohydrin rubber, polysulfide rubber, silicone rubber, fluorocarbon rubber and urethane rubber and elastomers. They can be produced by conventional injection molding and vulcanizing molding.

The liquid fuel F includes a methanol solution comprising methanol and water, but the liquid fuel shall not specifically be restricted as long as hydrogen ions ($H^+$) and electrons ($e^-$) are efficiently obtained from a compound supplied as fuel at a fuel electrode body described later. Liquid fuels such as dimethyl ether (DME), an ethanol solution, formic acid, hydrazine, an ammonia solution, ethylene glycol and a sodium boron hydride aqueous solution can be used as well, though depending on the structure of the fuel electrode body.

The above liquid fuels having various concentrations can be used according to the structure and the characteristics of the fuel cell, and the liquid fuels having a concentration of, for example, 1 to 100% can be used.

The follower 12 is brought into contact with a rear end of the liquid fuel F stored in the fuel-storing vessel 10 to seal the above liquid fuel F, and it moves as the fuel is consumed. It prevents the liquid fuel in the fuel-storing vessel 10 from leaking and vaporizing, and it prevents air from coming into the liquid fuel.

This follower 12 is required not to be dissolved or diffused in the liquid fuel F. If it is dissolved or diffused in the liquid fuel F, it is considered that not only the liquid fuel in the fuel-storing vessel 10 which is a fuel storing tank leaks and vaporizes so that the fuel-storing vessel does not play a role as a fuel storing tank, but also the substance constituting the follower 12 comes into the fuel electrode of the fuel cell main body together with the liquid fuel F to exert an adverse effect on the reaction in a certain case. The preferred characteristics of the follower 12 used in the present invention are selected taking these conditions into consideration.

The follower 12 which can be used comprises preferably an insoluble or slightly soluble liquid or a gelatinous matter of the above liquids, and the follower has preferably a specific gravity of 90 to 200% based on a specific gravity of the liquid fuel F.

The insoluble or slightly soluble liquid includes, for example, at least one selected from the group consisting of non-volatile or slightly volatile organic solvents such as polybutene, mineral oils, poly glycols, polyesters, silicone oils and liquid paraffins.

The polybutene which can be used includes, for example, Nissan Polybutene N (manufactured by NOF Corporation), LV-7, LV-10. LV-25, LX-50, LV-100, HV-15, HV-35, HV-50, HV-100, HV-300, HV-1900 and HV-3000 (all manufactured by Nippon Petrochemicals Co., Ltd.) and 35R (manufactured by Idemitsu Kosan Co., Ltd.) which are commercially available products. The mineral oils include, for example, Diana Process Oil MC-W90, PS-430 and PS-90 (manufactured by Idemitsu Kosan Co., Ltd.) which are commercially available products.

The silicone oils include, for example, KF-96 0.65 to 30,000 (all manufactured by Shi-Etsu Silicones Co., Ltd.).

The above non-volatile or slightly volatile organic solvents can be used alone or in combination of two or more kinds thereof.

The gelatinous matter of the insoluble or slightly soluble liquid is constituted from a matter containing the non-volatile or slightly volatile organic solvent described above and a thickener.

The thickener may be any one as long as it is soluble or swollen in the non-volatile or slightly volatile organic solvent described above and can turn the insoluble or slightly soluble liquid into a gelatinous matter. Capable of being used is, for example, at least one selected from styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica, acetalkoxyaluminum dialkylates, fatty acid metal salts and modified clay.

The styrene base thermoplastic elastomer (SBC) is a thermoplastic elastomer (TPE) which has a polystyrene block and a rubber intermediate block and in which a polystyrene part forms physical cross-linkage (domain) to become a cross-linking point, and capable of being used are a linear type or a radial type of TPE such as S-B-S, S-I-S, S-EB-S, S-EP-S, V-SI-S and the like which are obtained by combination of polystyrene (S) which is a hard segment with polybutadiene (B), polyisoprene (I), ethylene.butylene (EB), ethylene.propylene (EP) and vinyl-polyisoprene (V-I) which are soft segments and hydrogenated matters thereof.

The vinyl chloride base thermoplastic elastomer (TPVC) which can be used is TPE in which PVC and NBR are used for a hard segment and in which PVC is used for a soft segment, and the olefin base thermoplastic elastomer (TPO) is TPE in which polyolefin such as polypropylene and polyethylene is used for a hard segment and in which EPDM is used for a soft segment.

The polyamide base thermoplastic elastomer (TPAE) which can be used is a block copolymer in which nylon is used for a hard segment and in which polyester or polyol (PTMG or PPG) is used for a soft segment; the polyester base thermoplastic elastomer (TPEE) is a multiblock copolymer in which high crystalline aromatic polyester having a high melting point, for example, polybutylene terephthalate (PBT) is used for a hard segment and in which amorphous polyether having a low glass transition temperature (for example, −70° C. or lower), for example, polytetramethylene ether glycol (PTMG) is used for a soft segment and TPE of a type in which aliphatic polyester is used for a soft segment; and the polyurethane base thermoplastic elastomer (TPU) includes an incompletely plasticized type having partial cross-linkage in a molecule and a complete thermoplastic type comprising a completely linear polymer, wherein a polymer chain comprising diisocyanate and short chain glycol is a hard segment, and a polymer chain comprising diisocyanate and polyol is a soft segment. Various polymers can be formed according to the kinds and the amounts of diisocyanate and long and short chain polyols, and a caprolactone type, an adipic acid type and a polytetramethylene glycol type [a PTMG type (or an ether type)] can be used.

Hydrophobic silica and the like (Aerosil R-974D manufactured by Nippon Aerosil Co., Ltd. as a commercially available product) can be used as the fine particle silica.

The above thickeners can be used alone or in combination of two or more kinds thereof.

The follower comprising the gelatinous matter containing the above non-volatile or slightly volatile organic solvent and the thickener comprises 70 to 99.8% by weight (hereinafter referred to merely as [%]), preferably 85 to 99.5% and more preferably 90 to 99.5% of the non-volatile or slightly volatile organic solvent and 0.2 to 30%, preferably 0.5 to 15% and more preferably 0.5 to 10% of the thickener each based on the total amount of the follower.

The follower which can be used comprises, as described above, an insoluble or slightly soluble liquid or a gelatinous matter of the liquid, preferably a liquid gelatinous matter from the viewpoints of having good followability and stably supplying a liquid fuel even when a cartridge diameter is large, and the follower has preferably a specific gravity of 90 to 200%, more preferably 95 to 150% based on a specific gravity of the liquid fuel F in that it follows efficiently as the fuel is consumes.

In the present invention, a specific gravity of the follower is varied according to the kind and the concentration of the liquid fuel used. The specific gravities of the respective liquid fuels used at some concentrations are shown in the following Table 1.

TABLE 1

| Specific gravities of the respective liquid fuels | |
|---|---|
| Kind of liquid fuel | Specific gravity |
| Methanol | 0.79 |
| Ethanol | 0.79 |
| Dimethyl ether | 0.661 |
| Formic acid | 1.241 |
| Hydrazine | 1.00 |
| Aqueous ammonia (concentration 25%) | About 1.00 |
| Ethylene glycol | 1.10 |
| Sodium boron hydride aqueous solution (concentration 5%) | 1.05 |

| Concentration and specific gravity of methanol | |
|---|---|
| Methanol concentration (wt %) | Specific gravity |
| 0 | 0.998 |
| 10 | 0.982 |
| 20 | 0.967 |
| 30 | 0.952 |
| 40 | 0.935 |
| 50 | 0.916 |
| 60 | 0.895 |
| 70 | 0.872 |
| 80 | 0.847 |
| 90 | 0.820 |
| 100 | 0.792 |

In the present invention, when a 70% methanol solution (specific gravity: 0.872) is used as the liquid fuel F, a specific gravity of the follower comprising the insoluble or slightly soluble liquid or the gelatinous matter of the liquid is preferably 0.785 to 1.744, more preferably 0.785 to 1.308, and when DME (specific gravity: 0.661) is used as the liquid fuel F, a specific gravity of the follower is preferably 0.595 to 1.322, more preferably 0.595 to 0.9915.

In the present invention, the liquid fuel used for the fuel cell has a small specific gravity (most of them have 1 or less), and therefore the follower falling in a preferred range of the specific gravity is prepared by suitably combining the kind and a use amount of the insoluble or slightly soluble liquid described above and the kind and a use amount of the thickener and the production process thereof.

A use amount of the follower having the constitution described above is preferably 0.01 to 0.5 time, more preferably 0.1 to 0.2 time based on an initial filling amount (volume ratio) of the liquid fuel used in terms of good followability and impact resistance in falling. For example, when the storing vessel is loaded with 2 ml of a 70% methanol solution as the liquid fuel, the amount of the follower is preferably 0.2 to 0.4 ml.

The follower auxiliary member 13 used in the present invention has no fluidity and is insoluble in the liquid fuel, and it is inserted into the follower 12. It comprises a follower auxiliary member main body part 13a and at least one protruding part 13b formed at the upper end of the main body part 13a.

The above follower auxiliary member 13 is installed in order to allow the follower 12 to follow well without causing discontinuity of following even when the fuel is consumed at a large speed or the fuel-storing vessel of a tube type has a large diameter so as to load a large amount of the liquid fuel.

The protruding part 13b is formed in order to prevent the follower 12 from falling with being unable to support its own weight when laying the fuel cartridge sideways (horizontal disposition). In particular, the protruding part 13b can support the follower 12 by getting into the follower 12 which stays in the state that it is liable to move and fall immediately after the liquid fuel is consumed. Accordingly, it can prevent the follower 12 from falling and separating from the liquid fuel due to falling and can prevent the liquid fuel from being spilt out due to the separation, and in addition thereto, it can reduce as well an amount of the follower 12 installed.

Further, insertion of the follower auxiliary member 13 having a protruding part into the follower 12 makes it possible to reduce a cross-sectional area of the follower 12 (makes it possible as well to reduce a loading amount of the follower) even if a cross-sectional area of the tube vessel 10 is large, and the follower 12 can be prevented from falling to result in preventing the liquid fuel from being spilt out even when laying the cartridge sideways (horizontal disposition).

The material for the follower auxiliary member 13 includes, for example, polypropylene, ethylene.vinyl alcohol copolymer resins, polyacrylonitrile, nylon, polyethylene terephthalate, polycarbonate, polystyrene, polyvinylidene chloride, polyvinyl chloride and various rubbers, and solid comprising the above materials or hollow structures thereof and porous bodies can preferably be used.

The shape of the follower auxiliary member 13 includes a cylindrical shape, a quadrangular prism, a triangular prism shape, a spherical shape and a shape similar to a cross section of the fuel cartridge, and an entire (the main body part 12a+ the protruding part 13b) length (height) thereof accounts preferably for 30 to 70% based on the entire length of the follower 12.

The follower auxiliary member 13 used has preferably a cross-sectional area of 50% or more, more preferably 80 to 95% based on a cross-sectional area of the fuel-storing vessel 10 in a diameter direction in terms of exhibiting good followability when the fuel is consumed at a large speed or a diameter of the fuel-storing vessel has a large diameter so as to load a large amount of the liquid fuel. The follower auxiliary member 13 may assume a state in which it gets into the follower 12 comprising an insoluble or slightly soluble liquid or a gelatinous matter of the liquid or in which a part thereof comes out from a bottom part of follower 12.

The protruding part 13b of the follower auxiliary member 13 shall not specifically be restricted as long as it assumes a structure in which at least a part thereof can get into the follower 12 to thereby prevent the follower 12 from falling, and at least one protruding part has to be present at the upper end of the follower auxiliary member 13. If it has the above structure, it may assume as well a structure in which the follower auxiliary member 13 including the protruding part 13b gets into the follower 12, a structure in which a part of the protruding part 13b is projected from the follower 12 or a structure in which a part of a lower end of the follower auxiliary member 13 comes out from the follower 12.

The shape of the protruding part 13b may be any one as long as it has the characteristics described above, and it includes, as shown in FIG. 1 (a), a cylindrical protruding part 13b having a reduced diameter than that of the main body part 13a.

In the present embodiment, assumed is a state in which the follower 12 comprising an insoluble or slightly soluble liquid or a gelatinous matter of the liquid is present, as shown in FIG. 1 (a), between (space) the follower auxiliary member 13 and the fuel-storing vessel 10 and in which apart of the follower auxiliary member 13 is projected from the bottom of the follower 12.

Further, in the present embodiment, the fuel-storing vessel has an inner diameter of 6.0 mm, an outer diameter of 8.0 mm and a length of 100 mm; the liquid fuel F is a methanol solution (specific gravity: 0.872); 12a is a gelatinous matter (specific gravity: 1.0) of an insoluble or slightly soluble liquid; the follower auxiliary member 13 is made of polypropylene and has a specific gravity of 0.5; an entire length (height) of the main body part 13a and the protruding part 13b accounts for 70% based on the entire length of the follower; and a cross-sectional area of the main body part 13a accounts for 80% based on a cross-sectional area of the fuel-storing vessel 10 in a diameter direction. The cylindrical protruding part 13b is reduced (⅔) in a diameter than that of the main body part 13a.

Another shape of the protruding part 13b of the follower auxiliary member 13 includes, for example, the shapes of the respective protruding parts shown in (a) and (b) of FIG. 3 to FIG. 7.

Figure 3A:
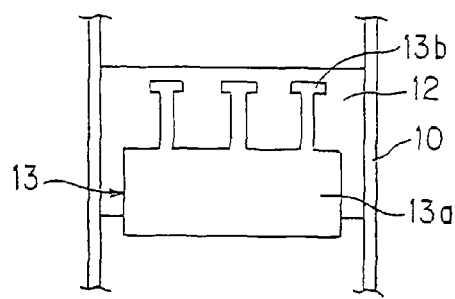
FIG. 3 (a) is a partial vertical cross-sectional drawing showing another aspect of a follower auxiliary member, and (b) is a plain view thereof.
Figure 3B:
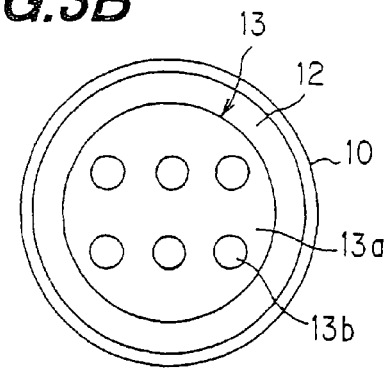

A protruding part 13b shown in FIGS. 3 (a) and (b) is constituted of six bar-like protruding parts having a circular flat plate at the upper end on a cylindrical main body part 13a.

Figure 4A:
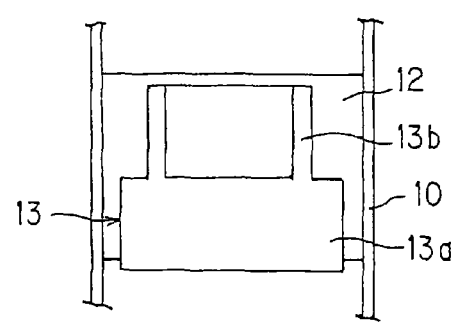
FIG. 4 (a) is a partial vertical cross-sectional drawing showing another aspect of a follower auxiliary member, and (b) is a plain view thereof.
Figure 4B:
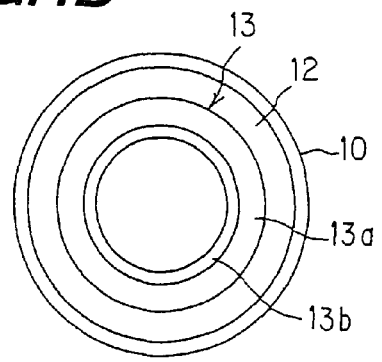

A protruding part 13b shown in FIGS. 4 (a) and (b) is constituted of a cylindrical protruding part on a cylindrical main body part 13a.

Figure 5A:
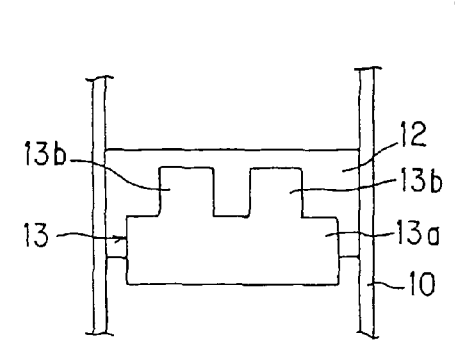
FIG. 5 (a) is a partial vertical cross-sectional drawing showing another aspect of a follower auxiliary member, and (b) is a plain view thereof.
Figure 5B:
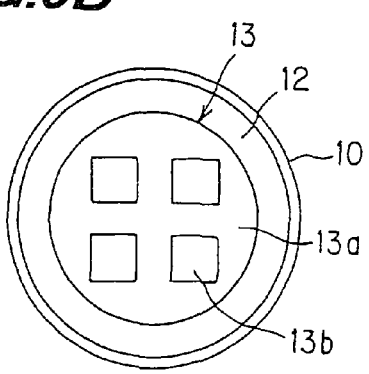

A protruding part 13b shown in FIGS. 5 (a) and (b) is constituted of four quadrangular prism-shaped protruding parts on a cylindrical main body part 13a.

Figure 6A:
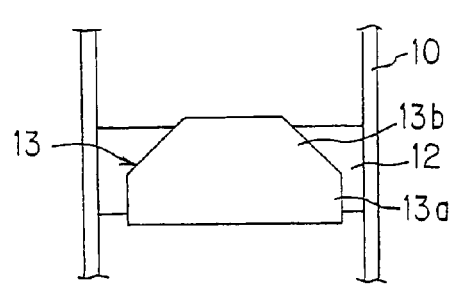
FIG. 6 (a) is a partial vertical cross-sectional drawing showing another aspect of a follower auxiliary member, and (b) is a plain view thereof.
Figure 6B:
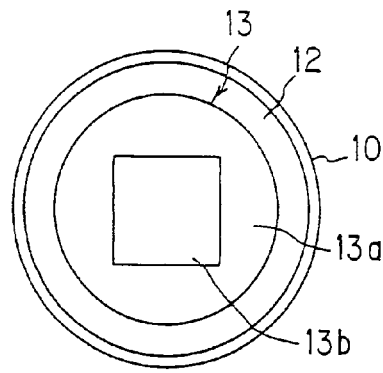

A protruding part 13b shown in FIGS. 6 (a) and (b) is constituted of a protruding part which is reduced in a diameter in a tapered shape and which has a quadrangular upper end face on a cylindrical main body part 13a, and it assumes a structure in which a part of the protruding part is projected from a follower 12.

Figure 7A:
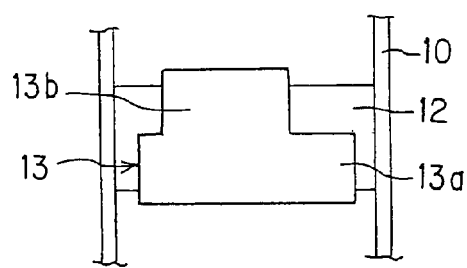
FIG. 7 (a) is a partial vertical cross-sectional drawing showing another aspect of a follower auxiliary member, and (b) is a plain view thereof.
Figure 7B:
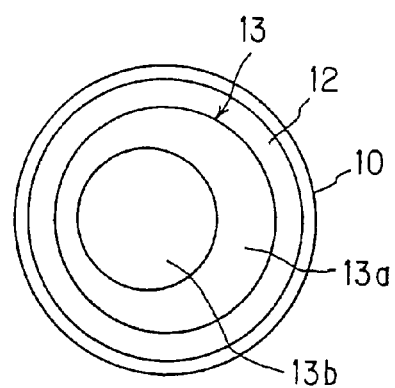
Figure 8:
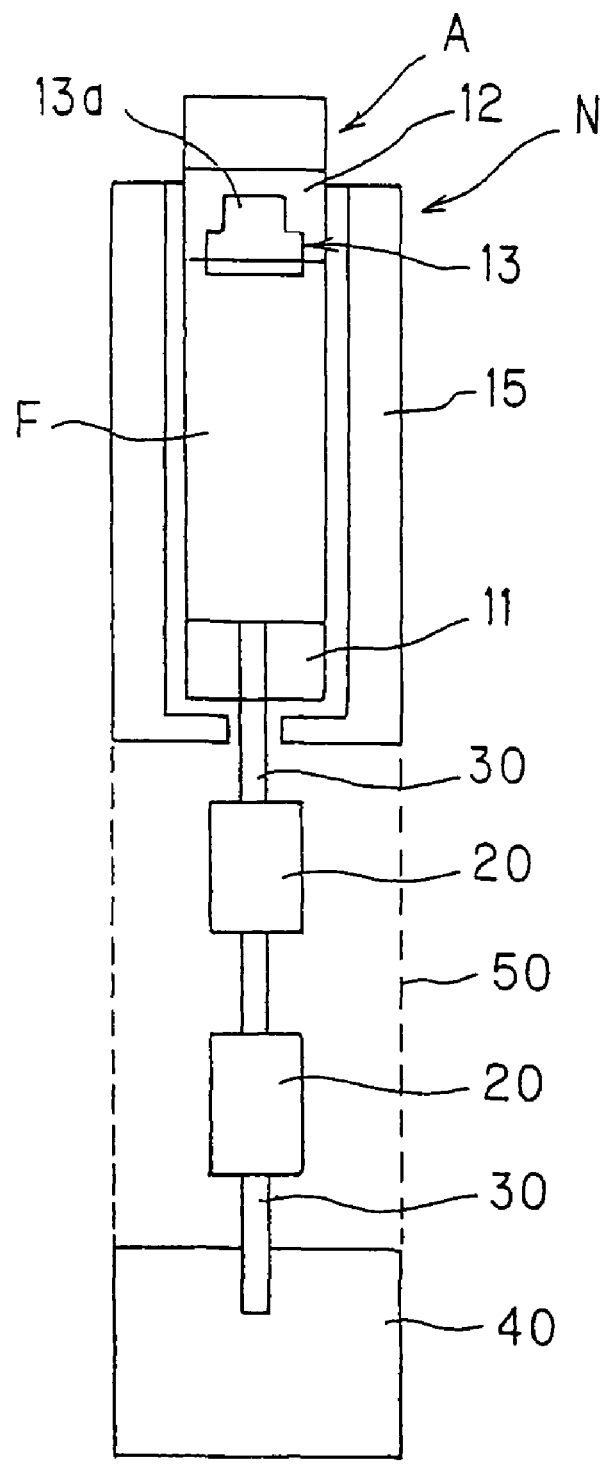
FIG. 8 is an outline cross-sectional drawing showing one example of a state in which the fuel cartridge of FIG. 1 is connected with a fuel cell main body and used as a fuel cell.
Figure 9A:
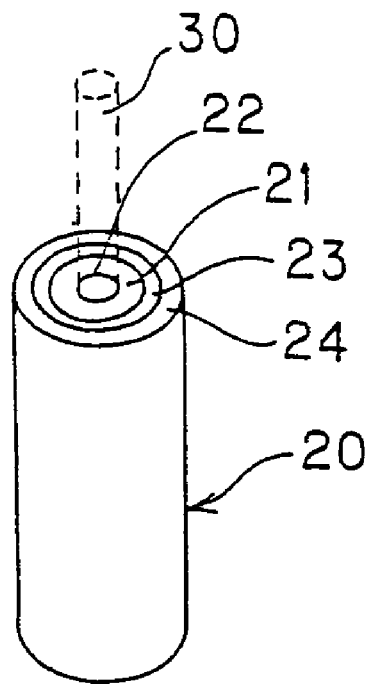
FIGS. 9 (a) and (b) are a perspective drawing and a vertical cross-sectional drawing which explain a cell.
Figure 9B:
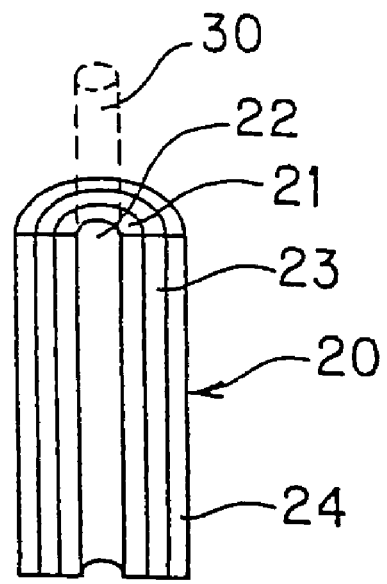

A protruding part 13b shown in FIGS. 7 (a) and (b) assumes a structure in which a protruding part having a reduced diameter than that of a cylindrical main body part 13a is provided on the main body part 13a in a length projecting from the follower A fuel cartridge A thus constituted is, as shown in FIG. 8 and FIG. 9, detachably connected with a fuel cell main body N and used.

That is, the fuel cell main body N is equipped, as shown in FIG. 8 and FIG. 9, with unit cells (fuel-cell units) 20, 20 formed by constructing an electrolyte layer 23 on the outer surface of a fuel electrode body 21 comprising a fine porous carbonaceous substance and constructing an air electrode layer 24 on the outer surface of the electrolyte layer 23, a fuel-supplying member 30 connected with the fuel reservoir A and having a penetrating structure and a used-fuel storing tank 40 provided at an end of the fuel-supplying member 30. Assumed is a structure in which the respective unit cells 20, 20 described above are joined in series and in which the fuel is supplied in order by means of the fuel-supplying member 30. The fuel cartridge A described above has an exchangeable cartridge structure and assumes a constitution in which it is inserted into a supporter 15 in the fuel cell main body N.

In this embodiment, the liquid fuel F is directly stored as shown in FIG. 1 to FIG. 2 (a), and the liquid fuel is supplied by means of the fuel-supplying member 30 inserted into a check valve 11 which is a fuel discharge part at a lower part of the fuel-storing vessel 10 for storing the liquid fuel F.

The fuel-storing vessel 10, the check valve 11 which is a fuel discharge part in the fuel cartridge A and the fuel-supplying member 30 are connected respectively with interfitting. In this case, if the respective members have a higher surface free energy than that of the liquid fuel F, the liquid fuel is liable to get into a gap of the junctions, and the possibility that the liquid fuel F leaks is enhanced. Accordingly, a surface free energy of the above members is preferably controlled to a lower level than that of the liquid fuel F at least on a wall surface brought into contact with the liquid fuel F. In respect to a method for controlling the surface free energy on a wall surface of the fuel-storing vessel 10 which is brought into contact with the liquid fuel can be subjected to water repellent film-forming treatment by coating a water repellent agent of a silicone resin or a fluorine base.

The respective unit cells 20 have, as shown in FIGS. 9 (a) and (b), the fuel electrode body 21 comprising a fine porous carbonaceous pillar body and in addition thereto, have a through part 22 in a central part thereof through which the fuel-supplying member 30 passes, and they assume a structure in which the electrolyte layer 23 is constructed on the outer surface of the fuel electrode body 21 described above and in which the air electrode layer 24 is constructed on the outer surface of the electrolyte layer 23. The respective unit cells 20 of the fuel cell generate an electromotive force of about 1.2 V per cell in theory.

The fine carbonaceous pillar body constituting the above fuel electrode body 21 may be any ones as long as they are a porous structure having fine communication holes, and it includes, for example, carbon composite molded articles which comprise a three-dimensional network structure or a point sintered structure and which are constituted from amorphous carbon and carbon powder, isotropic high density carbon molded articles, carbon fiber paper-making molded articles and activated carbon molded articles, and the carbon composite molded articles which comprise amorphous carbon and carbon powder and which have fine communication holes are preferred from the viewpoint of easiness in controlling reaction in the fuel electrode of the fuel cell and a rise in the reaction efficiency.

The carbon powder used for producing the above carbon composite bodies comprising a porous structure is preferably at least one (alone or combination of two or more kinds) selected from the group consisting of highly oriented pyrolytic graphite (HOPG), kish graphite, natural graphite, artificial graphite, carbon nanotube and fullerene from the viewpoint of the rise in the reaction efficiency.

A platinum-ruthenium (Pt—Ru) catalyst, an iridium-ruthenium (Ir—Ru) catalyst and a platinum-tin (Pt—Sn) catalyst are formed on the outer surface of the fuel electrode body 21 by a method in which a solution containing the above metal ions or a metal fine particle precursor such as metal complexes is subjected to impregnating or dipping treatment and then subjected to reducing treatment and an electrocrystallization method of metal fine particles.

The electrolyte layer 23 includes ion exchange membranes having proton conductivity or hydroxide ion conductivity, for example, fluorine base ion exchange membranes including Nafion (manufactured by Du Pont Co., Ltd.), and in addition thereto, it includes membranes in which heat resistance and inhibition in methanol crossover are good, for example, composite membranes comprising an inorganic compound as a proton conducting material and a polymer as a membrane material, to be specific, composite membranes using zeolite as the inorganic compound and styrene-butadiene base rubber as a polymer, and hydrocarbon base graft membranes.

The air electrode layer 24 includes porous carbonaceous bodies on which platinum (Pt), palladium (Pd) and rhodium (Rh) are carried by a method using a solution containing the metal fine particle precursor described above and which comprise a porous structure.

The fuel-supplying member 30 described above shall not specifically be restricted as long as it has a penetrating structure in which it can be inserted into the check valve 11 in the fuel reservoir A to supply the liquid fuel to the respective unit cells 20, and it includes, for example, those comprising porous bodies having capillary force which are constituted from felts, sponges, sintered bodies such as resin particle-sintered bodies and resin fiber-sintered bodies and fiber bundles comprising one or combination of two or more kinds of natural fibers, animal fibers, polyacetal base resins, acryl base resins, polyester base resins, polyamide base resins, polyurethane base resins, polyolefin base resins, polyvinyl base resins, polycarbonate base resins, polyether base resins and polyphenylene base resins. A porosity of the above porous bodies and fiber bundles is suitably set according to a supplying amount of the liquid fuel to the respective unit cells 20.

The used-fuel storing tank 40 is disposed at an end of the fuel-supplying member 30. In this case, it provides no problems to bring the used-fuel storing tank 40 into direct contact with the end of the fuel-supplying member 30 to occlude the used fuel directly in an occlusion body, and a sliver, a porous body or a fiber bundle may be provided as a feed at a junction brought into contact with the fuel-supplying member 30 to set it as a discharge passage for the used fuel.

The liquid fuel supplied by the fuel-supplying member 30 is used for reaction in a unit cell 20 of the fuel cell, and since a fuel supplying amount is linked with a fuel consuming amount, the liquid fuel which is discharged to the outside of the cell without reacting is scarcely found, so that a treating system is not required at a fuel outlet side as is the case with conventional liquid fuel type fuel cells. However, assumed is a structure in which when the fuel comes to be supplied in excess depending on an operation status, the liquid fuel which is not used for the reaction can be stored in the storing tank 40 to prevent an adverse effect from being exerted on the reaction in the electrode.

A numeral 50 is a member comprising a mesh structure which joins the fuel cartridge A with the used-fuel storing tank 40 and which allows the liquid fuel to be surely supplied from a fuel-storing vessel 10 to each of the respective unit cells 20, 20 via the fuel-supplying member 30.

In the fuel cell using the fuel cartridge A thus constituted, the liquid fuel is supplied from the fuel reservoir A to the fuel electrode body 21 via the fuel-supplying member 30 inserted into the check valve 11 which is a fuel supplying part and having a penetrating structure, whereby the liquid fuel is introduced into the unit cells 20, 20.

In the present invention, the fuel cartridge A detachably connected with the fuel cell main body comprises the fuel-storing vessel 10 for storing the liquid fuel F, the fuel discharge part 11 and the follower 12 which seals the liquid fuel and moves as the liquid fuel is consumed at the rear end of the liquid fuel F; the follower auxiliary member 13 which has no fluidity and is insoluble in the liquid fuel F is inserted into the follower 12, and at least one protruding part 13b is formed at the upper end part of the follower auxiliary member 13; accordingly, also when used is the fuel cell having a large consuming speed of the fuel or the fuel cell having a fuel-storing vessel of a tube type having a large diameter, the follower 12 into which the follower auxiliary member 13 is inserted moves without causing discontinuity of following as the fuel is consumed with electric power generation by the fuel cell, whereby reduction in a volume of the liquid fuel is followed, and in addition thereto, the follower moves as well when the fuel reservoir (liquid fuel) is heated by operation of the fuel cell, whereby it can follow as well expansion in the volume; as the follower auxiliary member can get into the follower 12 by means of the protruding part 13b, it can support the follower 12 to prevent the follower 12 from falling, and then prevent separating from the liquid fuel caused by falling and spilling of the liquid fuel caused by separating. Further, a filling amount of the follower 12 can be reduced by using the follower auxiliary member.

Further, insertion of the follower auxiliary member 13 having a protruding part into the follower 12 makes it possible to reduce a filling amount of the follower 12 even if a cross-sectional area of a tube vessel 10 is large and results in preventing the follower 12 from falling and the liquid fuel from spilling out even if the fuel cartridge is laid sideways (horizontal disposition).

Also, in the embodiment described above, capillary force is present at least in the fuel electrode body 21 and/or the fuel-supplying member 30 brought into contact with the fuel electrode body 21, and this capillary force makes it possible to supply stably and continuously the fuel directly from the fuel storing tank 10 to each of the respective unit cells 20, 20 without bringing about back flow and interruption. More preferably, setting capillary force of the used-fuel storing tank 40 larger than capillary force present in the fuel electrode body 21 and/or the fuel-supplying member 30 brought into contact with the fuel electrode body 21 makes it possible to flow stably and continuously the liquid fuel from the fuel storing tank 10 and the respective unit cells 20, 20 directly to the used-fuel storing tank respectively without bringing about back flow and interruption.

Further, assumed in the above fuel cell is a structure in which the liquid fuel can smoothly be supplied as it is without vaporizing without using specifically auxiliary appliances such as a pump, a blower, a fuel carburetor and a condenser, and therefore it becomes possible to reduce a size of the fuel cell.

Accordingly, in the fuel cell of the above embodiment, it becomes possible to turn the whole part of the fuel cell into a cartridge, and provided is the small-sized fuel cell which can be used as an electric power source for portable electronic appliances such as cellular phones and note type personal computers and digital cameras.

In the embodiment described above, a structure in which two fuel-cell cells 20 are used has been shown, and a required electromotive force can be obtained by increasing the number of the unit cells 20 joined (serial or parallel) according to the use purposes of the fuel cell.

Figure 10:
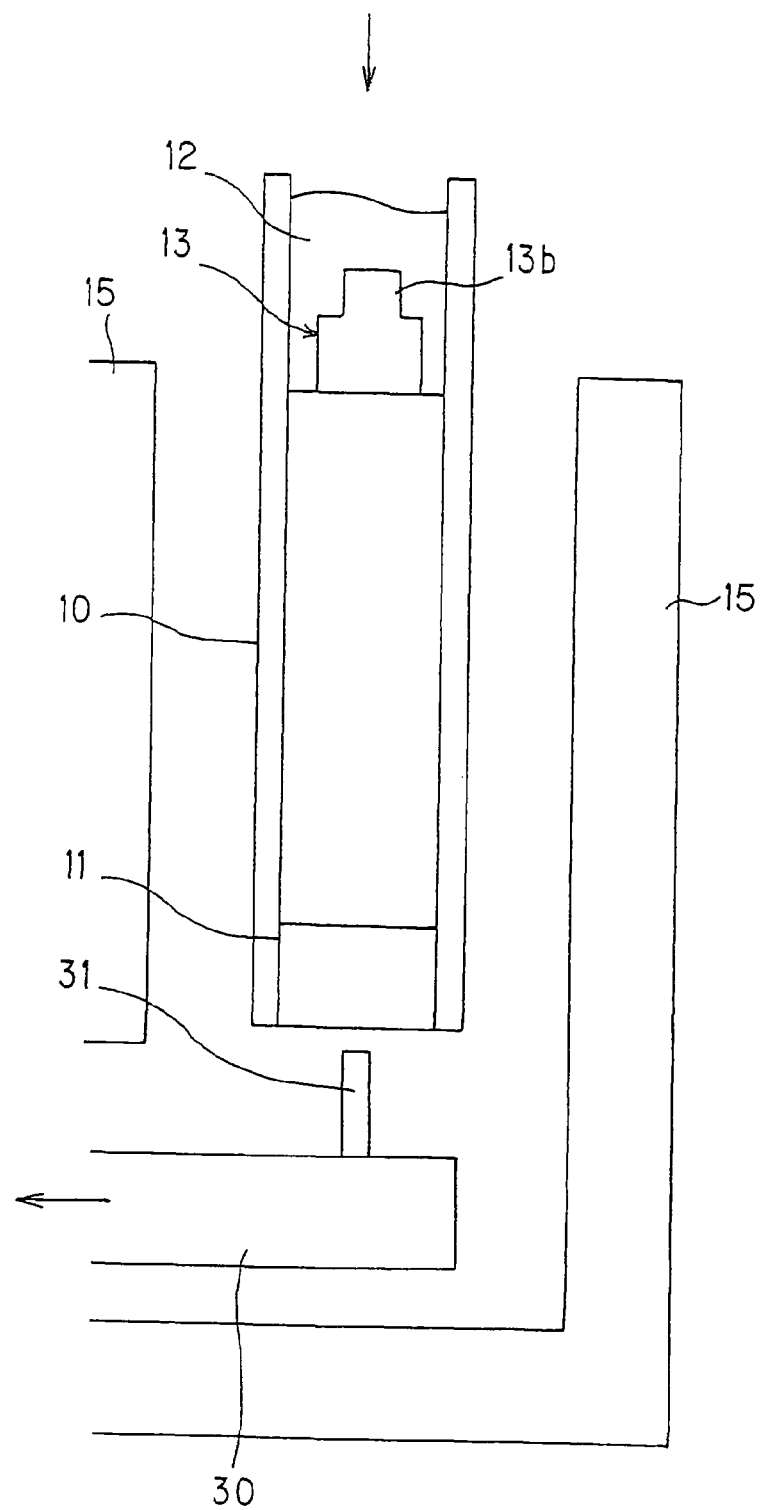
FIG. 10 is an outline vertical cross-sectional drawing showing a state before a fuel cartridge in the second embodiment of the present invention is installed in the fuel cell main body.
Figure 11:
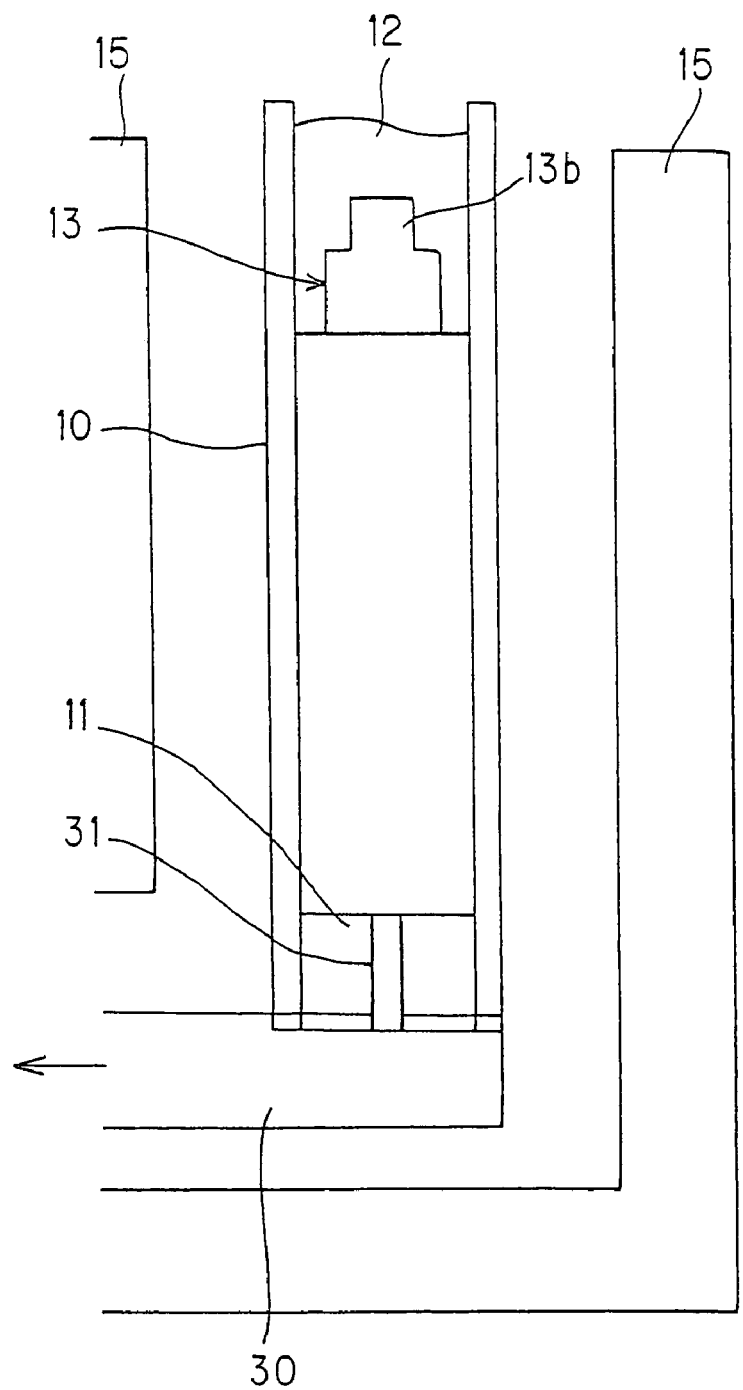
FIG. 11 is an outline vertical cross-sectional drawing showing in a state in which a fuel cartridge in the second embodiment of the present invention is installed in the fuel cell main body.

FIG. 10 and FIG. 11 show another embodiment of connection with a fuel cell main body. In the following embodiment, the members having the same structure and the same effects as in the fuel cell main body of the first embodiment described above shall be given the same reference numerals as in FIG. 1, and the explanations thereof shall be omitted.

The above embodiment is different from the first embodiment described above in that a fuel cartridge is connected, as shown in FIG. 10 and FIG. 11, with a fuel-supplying member 30 via a fuel-supplying tube 31 inserted into a check valve 11.

Assumed is, though not illustrated, a structure in which a tip of the fuel-supplying member 30 (an arrow direction in FIG. 10 and FIG. 11) is joined in series or in parallel with unit cells 20, 20 as is the case with the first embodiment (FIG. 8) described above.

In the fuel cell of the above embodiment, a fuel cartridge A of a fuel reservoir is exchangeable and has visibility, and it is equipped with a fuel-storing vessel 10 for storing a liquid fuel F, a fuel discharge part 11 having a check valve, a follower 12 which moves as the fuel is consumed and a follower auxiliary member 13 which is inserted into the follower 12 and which has a protruding part 13b, whereby the liquid fuel in the inside of the cartridge structure can visually be observed as is the case with the first embodiment described above. Accordingly, the consumption state of the fuel can visually be observed with ease, and the follower 12 with the follower auxiliary member 13 moves without causing discontinuity of following even when used is the fuel cell having a large consuming speed of the fuel or the fuel cell having the fuel-storing vessel of a tube type having a large diameter, whereby reduction in a volume of the liquid fuel is followed. In addition thereto, when the liquid fuel is heated by operation of the fuel cell, the follower moves to follow expansion in the volume. The follower auxiliary member can get into the follower 12 by means of the protruding part 13b, and therefore it can support the follower 12, so that falling of the follower 12 and spilling out of the liquid fuel caused by the falling can be prevented. This prevents the liquid fuel from being lost in storage, and capillary force of the fuel-supplying member 30 makes it possible to stably and continuously supply the fuel from the fuel-storing vessel 10 directly to each of the respective unit cells without causing back flow and interruption.

The fuel cartridge A of the present invention shall not be restricted to the respective embodiments described above and can be varied to various extents within the range of the technical concept of the present invention.

For example, the unit cell 20 having a cylindrical shape is used, but it may have other shapes such as a prism shape and a tabular shape. It may be joined with the fuel-supplying member 30 in parallel as well as in series.

In the embodiment described above, the check valve 11 shown in FIG. 2 (a) to (d) is used as a fuel discharge part, but it shall not specifically be restricted thereto as long as it assumes a structure in which foreign matters such as air are prevented from coming in the liquid fuel stored directly in the fuel-storing vessel 10 from the periphery of the fuel-supplying tube 31 due to change in the barometric pressure and the temperature and in which the liquid fuel can be supplied to the fuel-supplying member 30 inserted thereinto.

Further, in the embodiment described above, the present invention has been explained as a direct methanol fuel cell, but the present invention shall not be restricted to the direct methanol fuel cell described above as long as the fuel cartridge detachably connected with the fuel cell main body is equipped with the fuel-storing vessel for storing the liquid fuel, the fuel discharge part, the follower which seals the above liquid fuel and moves as the liquid fuel is consumed and the follower auxiliary member having a protruding part at the rear end of the liquid fuel, and it can suitably be applied as well to a fuel cell of a reforming type. Further, when the fuel-storing vessel of a tube type is increased in a diameter in a case where a large volume (for example, 100 ml or more) of the liquid fuel is charged, an amount of the follower and a size of the follower auxiliary member are increased or enlarged in order to meet it, whereby the follower can follow well without causing discontinuity of following.

Further, the fuel cell main body is constituted by constructing an electrolyte layer comprising a fine porous carbonaceous body on the outer surface of a fuel electrode body and constructing an air electrode layer on the outer surface of the electrolyte layer, but the structure of the fuel cell main body shall not specifically be restricted and may be, for example, a fuel cell main body assuming a constitution in which a unit cell obtained by forming the respective layers of electrode/electrolyte/electrode on the surface of a base material which comprises a porous carbonaceous body having an electric conductivity or a junction body obtained by joining two or more of the unit cells is provided and in which the base material is impregnated with a liquid fuel via a fuel-supplying member and a surface of an electrode formed on the outer surface of the base material is exposed to air.

EXAMPLES

Next, the present invention shall be explained in further details with reference to examples and comparative example, but the present invention shall not be restricted to the examples described below.

Examples 1 to 3 and Comparative Example 1

In Examples 1 to 3, members and a follower, a follower auxiliary member and a fuel cartridge filled with 2 g of a liquid fuel (70 wt % methanol solution, specific gravity: 0.87) each shown below were prepared respectively, and in Comparative Example 1, members and a follower and a fuel cartridge filled with 2 g of a liquid fuel (70 wt % methanol solution, specific gravity: 0.87) each shown below were prepared respectively. The liquid fuel was discharged from fuel discharge ports in the respective examples and comparative example at a rate of 0.2 ml/minute, and a discharge property of the liquid fuel and stability of the followers were evaluated by the following evaluation methods.

The results thereof are shown in the following Table 2.

Constitution of Fuel-Storing Vessel: Tube 1

Tube 1: length 100 mm, outer diameter 5.4 mm, inner diameter 4.0 mm, polypropylene-made extruded tube Fuel discharge part (check valve, based on FIG. 2): length 5 mm, outer diameter 4 mm, inner diameter 1 mm, made of silicone rubber Liquid fuel: 70 wt % methanol solution (specific gravity: 0.87)

Composition of Follower A

A gelatinous follower (specific gravity: 0.90) having the following blend composition was used.

| | |
|---|---|
| Mineral oil: Diana Process Oil MC-W90 (manufactured by Idemitsu Kosan Co., Ltd.) | 93 parts by weight |
| Hydrophobic silica: Aerosil R-974D (manufactured by Nippon Aerosil Co., Ltd., BET surface area: 200 m$^2$/g) | 6 parts by weight |
| Silicone base surfactant: SILWET FZ-2171 (manufactured by Nippon Unicar Co., Ltd.) | 1 part by weight |

Composition of Follower B

A gelatinous follower (specific gravity: 1.0) having the following blend composition was used.

| | |
|---|---|
| Silicone oil: KF-96 30,000 (manufactured by Shin-Etsu Silicone Co., Ltd.) | 93 parts by weight |
| Hydrophobic silica: Aerosil R-974D (manufactured by Nippon Aerosil Co., Ltd., BET surface area: 200 m$^2$/g) | 6 parts by weight |
| Silicone base surfactant: SILWET FZ-2171 (manufactured by Nippon Unicar Co., Ltd.) | 1 part by weight |

Composition of Follower C

A gelatinous follower (specific gravity: 1.0) having the following blend composition was used.

| | |
|---|---|
| Polybutene: Nissan Polybutene 015N (MW = 580, manufactured by NOF Corporation) | 94 parts by weight |
| Hydrophobic silica: Aerosil R-974D (manufactured by Nippon Aerosil Co., Ltd., BET surface area: 200 m$^2$/g) | 5 parts by weight |
| Silicone base surfactant: SILWET FZ-2110 (manufactured by Nippon Unicar Co., Ltd.) | 1 part by weight |

Follower Auxiliary Member (Based on FIG. 1)

Material: made of polypropylene, main body part shape: cylindrical, protruding part shape: cylindrical, main body part+protruding part, Structure: entire length: 7 mm (40% based on the entire length of the follower), protruding part length: 3 mm Specific gravity: 0.5, Cross-sectional area: 40% based on a cross-sectional area of the fuel-storing vessel 10 in a diameter direction.

Evaluation Method of Discharge Property

The discharge property was evaluated according to the following evaluation criteria.

Evaluation Criteria:

○: all the fuel filled could be discharged

Δ: 80% or more of the fuel could be discharged

X: discharged amount of the fuel was 50% or less

Evaluation Method of Stability of Follower

The respective tubes were horizontally disposed and allowed to fall down sideways three times from a height of 30 cm under the condition that they were heated at a temperature of 50° C. to evaluate the stability according to the following evaluation criteria.

Evaluation Criteria:

○: no deformation of the follower

Δ: deformation of the follower is present

X: the follower drops out, and the fuel leaks

TABLE 2

|  | Example 1 | Example 2 | Example 3 | Comparative Example 1 |
|---|---|---|---|---|
| Kind of tube | Tube 1 | Tube 1 | Tube 1 | Tube 1 |
| Liquid fuel | 70 wt % methanol aqueous solution | | | |
| Kind of follower | Follower A | Follower B | Follower C | Follower A |
| Follower auxiliary member | Present | Present | Present | None |
| Evaluation | | | | |
| Discharge property | ○ | ○ | ○ | ○ |
| Follower stability | ○ | ○ | ○ | X |

As apparent from the results shown in Table 2 described above, it has been found that in Examples 1 to 3 falling in the scope of the present invention, the fuel cartridges are excellent in a discharge property of the liquid fuel and stability of the followers as compared with those in Comparative Example 1 falling outside the scope of the present invention. To be specific, it has been found that in Examples 1 to 3 and Comparative Example 1, the followers move as the fuel is consumed so that the fuel can completely be consumed, but it has been found that in stability test, stability of the follower is inferior in Comparative Example 1 in which a follower auxiliary member having a protruding part is not used.

INDUSTRIAL APPLICABILITY

The liquid fuel cartridge of the present invention can suitably be used for a small-sized fuel cell which is used as an electric power source for portable electronic appliances such as cellular phones, note type personal computers, PDA, digital cameras and electronic notebooks.

What is claimed is:

1. A fuel cartridge detachably connected with a fuel cell main body, wherein the fuel cartridge is equipped with a fuel-storing vessel for storing a liquid fuel, a fuel discharge part and a liquid or gelatinous follower which seals the liquid fuel and moves as the liquid fuel is consumed and which is installed at the rear end of the liquid fuel; a follower auxiliary member which has no fluidity and is insoluble in the liquid fuel is inserted into the follower; and at least one columnar or pillar-shaped protruding part having a width smaller than a width of the follower auxiliary member is formed at an upper end part of the follower auxiliary member.

2. The fuel cartridge as described in claim 1, wherein the follower comprises at least one selected from the group of consisting of liquids which are insoluble or slightly soluble in the liquid fuel and gelatinous matters of the liquids, and the follower has a specific gravity of 90 to 200% based on a specific gravity of the liquid fuel.

3. The fuel cartridge as described in claim 2, wherein the insoluble or slightly soluble liquid comprises a non-volatile or slightly volatile organic solvent, and the gelatinous matter of the insoluble or slightly soluble liquid comprises a non-volatile or slightly volatile organic solvent and a thickener.

4. The fuel cartridge as described in claim 3, wherein the non-volatile or slightly volatile organic solvent is at least one selected from the group consisting of polybutene, mineral oils, silicone oils and liquid paraffins.

5. The fuel cartridge as described in claim 3, wherein the thickener is at least one selected from the group consisting of styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

6. The fuel cartridge as described in claim 1, wherein the follower auxiliary member has a cross-sectional area of 50% or more based on a cross-sectional area of the fuel-storing vessel in a diameter direction.

7. The fuel cartridge as described in claim 1, wherein the follower auxiliary member is any of solid, a hollow structure and a porous body.

8. The fuel cartridge as described in claim 1, wherein a part of the protruding part is projected from the follower.

9. The fuel cartridge as described in claim 1, wherein the liquid fuel is at least one selected from the group consisting of a methanol solution, an ethanol solution, dimethyl ether (DME), formic acid, hydrazine, an ammonia solution, ethylene glycol and a sodium boron hydride aqueous solution.

10. The fuel cartridge as described in claim 1, wherein a surface free energy of at least a wall face which is brought into contact with the liquid fuel in the fuel-storing vessel is controlled to a lower value than a surface free energy of the liquid fuel.

11. The fuel cartridge as described in claim 1, wherein the fuel cell main body assumes a structure in which plural unit cells each of which is formed by constructing an electrolyte layer on the outer surface of a fuel electrode body and constructing an air electrode layer on the outer surface of the electrolyte layer are joined and in which a fuel-supplying member connected with the fuel cartridge is connected with the unit cells to supply the liquid fuel.

* * * * *